(12) United States Patent
Kono et al.

(10) Patent No.: US 9,533,669 B2
(45) Date of Patent: Jan. 3, 2017

(54) VEHICLE CONTROL DEVICE

(75) Inventors: Katsumi Kono, Toyota (JP); Norimi Asahara, Numadu (JP); Jonggap Kim, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 135 days.

(21) Appl. No.: 14/234,816

(22) PCT Filed: Jul. 25, 2011

(86) PCT No.: PCT/JP2011/066871
§ 371 (c)(1),
(2), (4) Date: Jan. 24, 2014

(87) PCT Pub. No.: WO2013/014741
PCT Pub. Date: Jan. 31, 2013

(65) Prior Publication Data
US 2014/0156171 A1   Jun. 5, 2014

(51) Int. Cl.
*B60W 10/02*   (2006.01)
*B60W 30/18*   (2012.01)
(Continued)

(52) U.S. Cl.
CPC ........ *B60W 10/02* (2013.01); *B60W 30/18072* (2013.01); *F02D 7/00* (2013.01);
(Continued)

(58) Field of Classification Search
CPC  F02D 7/00; F02D 2200/501; F02D 2200/502; F02D 41/0215; F02D 41/022; F02D 29/00; B60W 10/02; B60W 2030/1809; B60W 2720/106; F16D 48/06; F16D 2500/3108; F16D 2500/3127; F16D 2500/3144; F16D 2500/5085; F16D 2500/70424; B60K 2741/02; B60K 2741/24; B60K 2741/245
(Continued)

(56) References Cited

U.S. PATENT DOCUMENTS 4,393,964 A * 7/1983 Kemper ................ B60K 6/105
                                                 192/3.58
5,667,458 A * 9/1997 Narita ................... F16H 61/143
                                                 477/118
(Continued)

FOREIGN PATENT DOCUMENTS

DE   102009057393 A1   6/2011
EP   1475265 A2         11/2004
JP   2010-203544 A      9/2010

*Primary Examiner* — Thomas Moulis
(74) *Attorney, Agent, or Firm* — Andrews Kurth Kenyon LLP (57) ABSTRACT

A vehicle control device is a vehicle control device for a vehicle capable of coasting, in which when there is no acceleration or deceleration request to the vehicle while traveling, power transmission between an engine and drive wheels is cut off and the vehicle is allowed to travel by inertia, wherein in a state in which there is no acceleration or deceleration request to the vehicle while traveling and power is transmitted between the engine and the drive wheels, whether or not to implement the coasting is determined by comparing a required deceleration rate Dt which is estimated as a deceleration rate to be later required of the vehicle and a coasting deceleration rate Dn which is estimated as a deceleration rate during the coasting. Where it is determined to implement the coasting, power transmission between the engine and the drive wheels is cut off and the coasting is implemented, and where it is determined not to implement the coasting, power transmission between the engine and the drive wheels is maintained. As a result, the (Continued)

implementation of coasting that can provide a sense of anxiety or discomfort to the driver can be suppressed.

3 Claims, 5 Drawing Sheets (51) Int. Cl.
    *F16D 48/06*     (2006.01)
    *F02D 7/00*     (2006.01)

(52) U.S. Cl.
    CPC ..... *F16D 48/06* (2013.01); *B60W 2030/1809* (2013.01); *B60W 2720/106* (2013.01); *F16D 2500/3101* (2013.01); *F16D 2500/3108* (2013.01); *F16D 2500/3127* (2013.01); *F16D 2500/3144* (2013.01); *F16D 2500/31466* (2013.01); *F16D 2500/5085* (2013.01); *F16D 2500/7041* (2013.01); *F16D 2500/70424* (2013.01)

(58) Field of Classification Search
    USPC ........ 701/103, 54, 79, 93, 94, 110; 123/320, 123/325, 332, 334, 493, 481, 198 DB; 477/70–80, 166–181
See application file for complete search history.

(56) References Cited

U.S. PATENT DOCUMENTS

| | | | | |
|---|---|---|---|---|
| 5,713,425 | A * | 2/1998 | Buschhaus | B60K 6/36 180/297 |
| 5,954,779 | A * | 9/1999 | Dietzel | B60K 6/46 180/165 |
| 6,019,698 | A * | 2/2000 | Lawrie | B60K 6/48 477/3 |
| 6,102,831 | A * | 8/2000 | Wakahara | B60W 10/02 477/169 |
| 6,138,071 | A * | 10/2000 | Sekine | B60K 31/042 180/170 |
| 6,307,277 | B1 * | 10/2001 | Tamai | B60K 6/26 180/65.26 |
| 6,332,354 | B1 * | 12/2001 | Lalor | B60T 8/00 701/70 |
| 6,360,158 | B1 * | 3/2002 | Hanawa | B60W 30/16 180/179 |
| 6,860,833 | B2 * | 3/2005 | Ayabe | B60W 10/06 477/121 |
| 6,887,180 | B2 * | 5/2005 | Pels | B60K 6/36 477/3 |
| 7,089,102 | B2 * | 8/2006 | Slayton | B60W 10/115 477/132 |
| 7,305,300 | B2 * | 12/2007 | Gibson | F02D 13/04 123/399 |
| 7,572,201 | B2 * | 8/2009 | Supina | B60K 6/40 180/65.22 |
| 7,758,467 | B2 * | 7/2010 | Ashizawa | B60K 6/36 477/5 |
| 2004/0014565 | A1 * | 1/2004 | Oshima | B60W 10/06 477/182 |
| 2007/0173372 | A1 * | 7/2007 | Ueno | B60K 6/48 477/3 |
| 2008/0091314 | A1 * | 4/2008 | Hayashi | B60K 6/48 701/22 |
| 2011/0165992 | A1 * | 7/2011 | Ueno | B60K 6/365 477/9 |
| 2013/0297112 | A1 * | 11/2013 | Gibson | B60W 20/50 701/22 |
| 2013/0297113 | A1 * | 11/2013 | Banker | B60W 20/00 701/22 |
| 2016/0059703 | A1 * | 3/2016 | Miller | B60L 3/0015 701/22 |

* cited by examiner

VEHICLE CONTROL DEVICE

CROSS-REFERENCE TO RELATED APPLICATIONS

This is a national phase application based on the PCT International Patent Application No. PCT/JP2011/066871 filed on Jul. 25, 2011, the entire contents of which are incorporated herein by reference.

TECHNICAL FIELD

The invention relates to a vehicle control device.

BACKGROUND ART

A vehicle is available that is capable of coasting in which an engine and drive wheels are disconnected while traveling and the vehicle travels by inertia in order to inhibit fuel consumption. For example, Patent Document 1 discloses a technique of taking an accelerator depression amount and a clutch revolution speed as indexes and determining whether or not to execute coasting on the basis of the movement of the coordinate points of those indexes on a coasting control determination map.

Patent Document 1: Japanese Patent Application Publication No. 2010-203544

SUMMARY OF THE INVENTION

However, with the conventional technique for determining whether or not to implement coasting, such as described in Patent Document 1, the implementation of coasting can be contrary to the driver's intention to decelerate depending on the traveling environment or traveling scene of the vehicle, which may provide a sense of anxiety or discomfort to the driver. For example, when the driver has a clear intention to decelerate because the vehicle travels up or down a steep hill, or because of traffic lights or railway crossing, the implementation of coasting can provide a sense of anxiety or discomfort to the driver.

The invention has been created with the foregoing in view, and it is an object thereof to provide a vehicle control device capable of suppressing the implementation of coasting that can provide a sense of anxiety or discomfort to the driver.

In order to resolve the abovementioned problem, the invention provides a vehicle control device for a vehicle capable of coasting, in which when there is no acceleration or deceleration request to the vehicle while traveling, power transmission between an engine and drive wheels is cut off and the vehicle is allowed to travel by inertia, wherein in a state in which there is no acceleration or deceleration request to the vehicle while traveling and power is transmitted between the engine and the drive wheels, whether or not to implement the coasting is determined by comparing a required deceleration rate that is estimated as a deceleration rate to be later required of the vehicle and a coasting deceleration rate that is estimated as a deceleration rate during the coasting, and where it is determined to implement the coasting, power transmission between the engine and the drive wheels is cut off and the coasting is implemented, and where it is determined not to implement the coasting, power transmission between the engine and the drive wheels is maintained.

In the vehicle control device, it is preferred that the required deceleration rate be the larger of an expected deceleration rate in a case where there is no deceleration request to the vehicle, and an expected deceleration rate in a case where there is a deceleration request to the vehicle.

In the vehicle control device, it is preferred that the expected deceleration rate in a case where there is no deceleration request to the vehicle be determined on the basis of a vehicle speed and a road grade.

It is preferred that the vehicle control device include an information acquisition device that acquires surrounding information relating to the vehicle, and that the expected deceleration rate in a case where there is a deceleration request to the vehicle be estimated from the surrounding information relating to the vehicle that is acquired by the information acquisition device.

In the vehicle control device, it is preferred that a determination criterion for determining whether or not to implement the coasting be changed according to the traveling scene relating to the vehicle.

In the vehicle control device, it is preferred that control of stopping fuel injection to the engine be implemented in response to the determination that the coasting is not to be performed.

In the vehicle control device in accordance with the invention, when the coasting conditions are fulfilled, whether or not to implement the coasting is determined by comparing a required deceleration rate that is estimated as a deceleration rate to be later required of the vehicle and a coasting deceleration rate that is estimated as a deceleration rate during the coasting. Therefore, the implementation of coasting can be avoided by using the relationship between the required deceleration rate and coasting deceleration rate. As a result, it is unlikely that the coasting be implemented, for example, when the driver wishes to perform deceleration at a rate greater than the present deceleration rate, and the frequency of providing a sense of anxiety or discomfort to the driver can be greatly reduced. The resultant effect is that the vehicle control device in accordance with the invention can suppress the implementation of coasting that can provide a sense of anxiety or discomfort to the driver.

MODES FOR CARRYING OUT THE INVENTION

An embodiment of the vehicle control device in accordance with the invention will be explained hereinbelow with reference to the appended drawings. Like or corresponding components are assigned with like reference numerals and the explanation thereof is not repeated.

Figure 1:
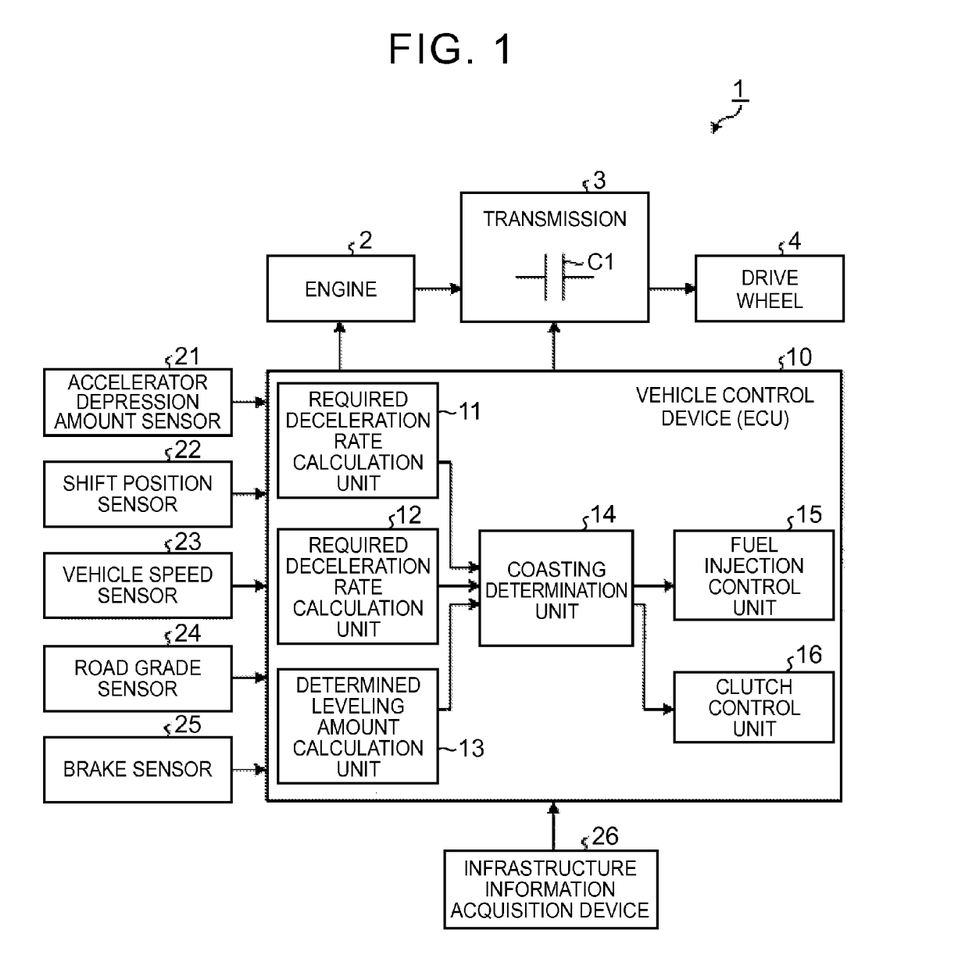
FIG. 1 illustrates the schematic configuration of the vehicle control device according to an embodiment of the invention.

The configuration of a vehicle control device 10 according to an embodiment of the invention is initially explained with reference to FIG. 1. As shown in FIG. 1, the vehicle control device 10 of the present embodiment is installed on a vehicle 1.

The vehicle 1 is provided with an engine 2, a transmission 3, and drive wheels 4. The engine 2 is an internal combustion engine which is a drive unit of the vehicle 1. The drive power of the engine is controlled according to the fuel injection amount. The transmission 3 is a drive power transmitting mechanism that transmits the drive power generated by the engine 2 to the drive wheel 4 side. A clutch C1 that is detachably connected to the rotating shaft of the engine 2 is provided in the transmission 3. The clutch C1 is, for example, a clutch device of a friction engagement system. When the clutch is engaged, the engine 2 and the drive wheels 4 are connected, and the drive power of the engine 2 is transmitted to the drive wheel 4 side. When the clutch is disengaged, the engine and the drive wheels are disconnected and the transmission of drive power from the engine 2 to the drive wheel 4 side can be cut off. The drive wheels 4 are driven by the drive power of the engine 2 transmitted by the transmission 3 and enable the vehicle 1 to travel forward or rearward.

Components of the vehicle 1, such as the engine 2 and the transmission 3 (clutch C1) are controlled by the vehicle control device 10 on the basis of information of various sensors located in the vehicle. In particular, in the present embodiment, the vehicle control device 10 is configured to be capable of cutting off power transmission between the engine 2 and the drive wheels 4 and executing the coasting control that allows the vehicle 1 to travel by inertia when there is no acceleration or deceleration request to the vehicle 1 while traveling. More specifically, the coasting control includes at least one of a deceleration eco-run control, free-run control, and N inertial control. The deceleration eco-run control, free-run control, and N inertial control are running controls that cause the vehicle 1 to travel in a state in which the clutch C1 is disengaged and the transmission of power between the engine 2 and the drive wheels 4 is cut off. Such controls execute coasting in which the vehicle 1 is allowed to travel by inertia.

In the deceleration eco-run control and free-run control, the vehicle 1 is allowed to travel in a state with disengaged clutch C1 and stopped engine 2. In the deceleration eco-run control and free-run control, fuel economy can be improved since fuel consumption by the engine 2 is stopped. The difference between the deceleration eco-run control and the free-run control it that the deceleration eco-run control mainly stops the operation of the engine 2 and executes idling stop when the vehicle 1 is decelerated or stopped following the braking operation performed by the driver, whereas the free-run control actively stops the operation of the engine 2 and executes idling stop not only when the vehicle 1 is decelerated or stopped after braking.

The N inertia control causes the vehicle 1 to travel in a state in which the clutch C1 is disengaged, while the engine 2 operates. In the N inertia control, the running load is reduced and fuel economy is improved since no engine brake operation is performed. Further, since the revolution of the engine 2 is maintained, excellent acceleration response is obtained when returning to normal operation from the N inertia control.

The inertial running control such as deceleration eco-run control, free-run control, and N inertial control is generally executed when no acceleration request is issued, for example, in the case of acceleration OFF. The execution conditions of each control are set according, for example, to the brake operation state, vehicle speed, battery charge amount, and road grade.

The vehicle control device 10 of the present embodiment is also configured to be capable of executing the fuel cut-off control that stops fuel injection to the engine 2 as the vehicle travels, thereby making it possible to improve fuel economy.

The vehicle control device 10 is connected to an accelerator depression amount sensor 21, a shift position sensor 22, a vehicle speed sensor 23, a road grade sensor 24, a brake sensor 25, an infrastructure information acquisition unit 26, the engine 2, and the transmission 3 (clutch C1).

The accelerator depression amount sensor 21 detects the accelerator depression amount which is proportional to the operation amount of an accelerator pedal. The shift position sensor 22 detects the shift position corresponding to the position of a shift lever. The vehicle speed sensor 23 detects the running speed of the vehicle 1. The vehicle speed sensor 23 can detect the vehicle speed, for example, on the basis of the rotation speed of each wheel of the vehicle 1.

The road grade sensor 24 detects a road grade. The road grade sensor 24 can detect or estimate the grade of the road where the vehicle 1 travels on the basis, for example, of the inclination of the vehicle 1 in the longitudinal direction.

The brake sensor 25 detects the operation amount of the brake pedal or where or not the brake operation is performed. The operation amount of the brake pedal is, for example, the pedal stroke of the brake pedal or the depression force applied to the brake pedal. The presence/absence of the brake operation can be determined, for example, buy a switch connected to the brake pedal.

The infrastructure information acquisition unit (information acquisition unit) 26 acquires infrastructure information (surrounding information) on the surroundings of the vehicle 1 that can be acquired in cooperation with the infrastructure. The infrastructure information acquisition unit 26 can be configured of various devices such as a device in which information of various types is transmitted or received by a transceiver, such as a light beacon disposed at the road side, to or from a road communication unit of the vehicle 1, a global positioning system (GPS) device, a navigation device, a vehicle-to-vehicle communication unit, and a device receiving information from a vehicle information and communication system (VICS) center or the like. The infrastructure information acquisition unit 26 acquires, for example, road information on the road where the vehicle 1 travels or signal information relating to traffic lights in front of the vehicle 1 as the infrastructure information. The road information typically includes speed limit information on the road where the vehicle 1 travels and stop line position information on the intersections. The signal information typically includes signal cycle information on lighting cycles of green light, yellow light, and red light of traffic lights or signal change timings.

The vehicle control device 10 determines whether or not to execute the coasting control on the basis of input information from the accelerator depression amount sensor 21, shift position sensor 22, vehicle speed sensor 23, road grade sensor 24, brake sensor 25, and infrastructure information acquisition unit 26, and executes the disengagement control of the clutch C1 of the transmission 3 or the fuel cut-off control that stops fuel injection in the engine 2 according to the determination result.

More specifically, as shown in FIG. 1, the vehicle control device 10 is configured to realize the functions of a required deceleration rate calculation unit 11, a coasting deceleration rate calculation unit 12, a determined leveling amount calculation unit 13, a coasting determination unit 14, a fuel injection control unit 15, and a clutch control unit 16.

The required deceleration rate calculation unit 11 calculates the estimated value of the deceleration rate that will be required by the driver operating the vehicle 1, in other words, the required deceleration rate Dt representing the estimated value of the deceleration rate that will be later required of the vehicle 1, while the vehicle 1 travels. More specifically, the required deceleration rate calculation unit 11 separately calculates the "expected deceleration rate Dt_int when there is a deceleration request to the vehicle 1" and the "expected deceleration rate Dt_unint when there is no deceleration request to the vehicle 1 (when cruising is intended)", and calculates the larger of the two as the required deceleration rate Dt. The calculation of Dt_int and Dt_unint is explained hereinbelow with reference to FIGS. 2 to 4.

The coasting deceleration rate calculation unit 12 calculates the deceleration rate of the vehicle 1 when the engine is disconnected, that is, a coasting deceleration rate Dn representing the estimated value of the deceleration rate of the vehicle 1 when engine disconnection (clutch disengagement) is executed in the present running state. The coasting deceleration degree Dn can be calculated from the vehicle speed, road grade, aerodynamic resistance of the vehicle 1, and friction torques of various components of the vehicle 1. The calculation process is explained in detail hereinbelow with reference to FIGS. 2 and 5.

The determined leveling amount calculation unit 13 calculates the determined leveling amount ΔD for determining whether or not to execute the coasting control. The determined leveling amount ΔD can be varied according to the traveling scene.

The coasting determination unit 14 determines whether or not to execute the coasting control on the basis of the required deceleration rate Dt calculated by the required deceleration rate calculation unit 11, the coasting deceleration rate Dn calculated by the coasting deceleration rate calculation unit 12, and the determined leveling amount ΔD calculated by the determined leveling amount calculation unit 13, when the conditions for coasting are fulfilled. When it is determined to execute the coasting control, a control command is transmitted to the clutch control unit 16, the disengagement control of the clutch C1 is executed, power transmission between the engine 2 and the drive wheels 4 is cut off, and coasting is executed. When it is determined not to execute the coasting control, a control command is sent to the fuel injection control unit 15, while maintaining power transmission between the engine 2 and the drive wheels 4, and fuel cut-off control that stops fuel injection to the engine 2 is executed.

The fuel injection control unit 15 controls the fuel injection amount of the engine 2 in response to the control command from the coasting determination unit 14.

The clutch control unit 16 controls the engagement/disengagement of the clutch C1 of the transmission 3 in response to the control command from the coasting determination unit 14.

In this case, the vehicle control device 10 is physically an electronic control unit (ECU) having a central processing unit (CPU), a random access memory (RAM), and a read only memory (ROM). The functions of various units of the vehicle control device 10 shown in FIG. 1 are realized by loading the application program stored in the ROM into the RAM and executing the program with the CPU, whereby the devices in the vehicle 1 are operated on the basis of CPU control and data in the RAM or ROM are read and written. The vehicle control device 10 is not limited to the functions of the abovementioned units and is provided with various other functions used as the ECU of the vehicle 1. The abovementioned ECU may be also configured to include a plurality of ECU such as an engine ECU that controls the engine 2, a transmission (T/M)-ECU that controls the transmission 3, and a start & stop (S&S)-ECU for executing the coasting (S&S control).

Figure 2:
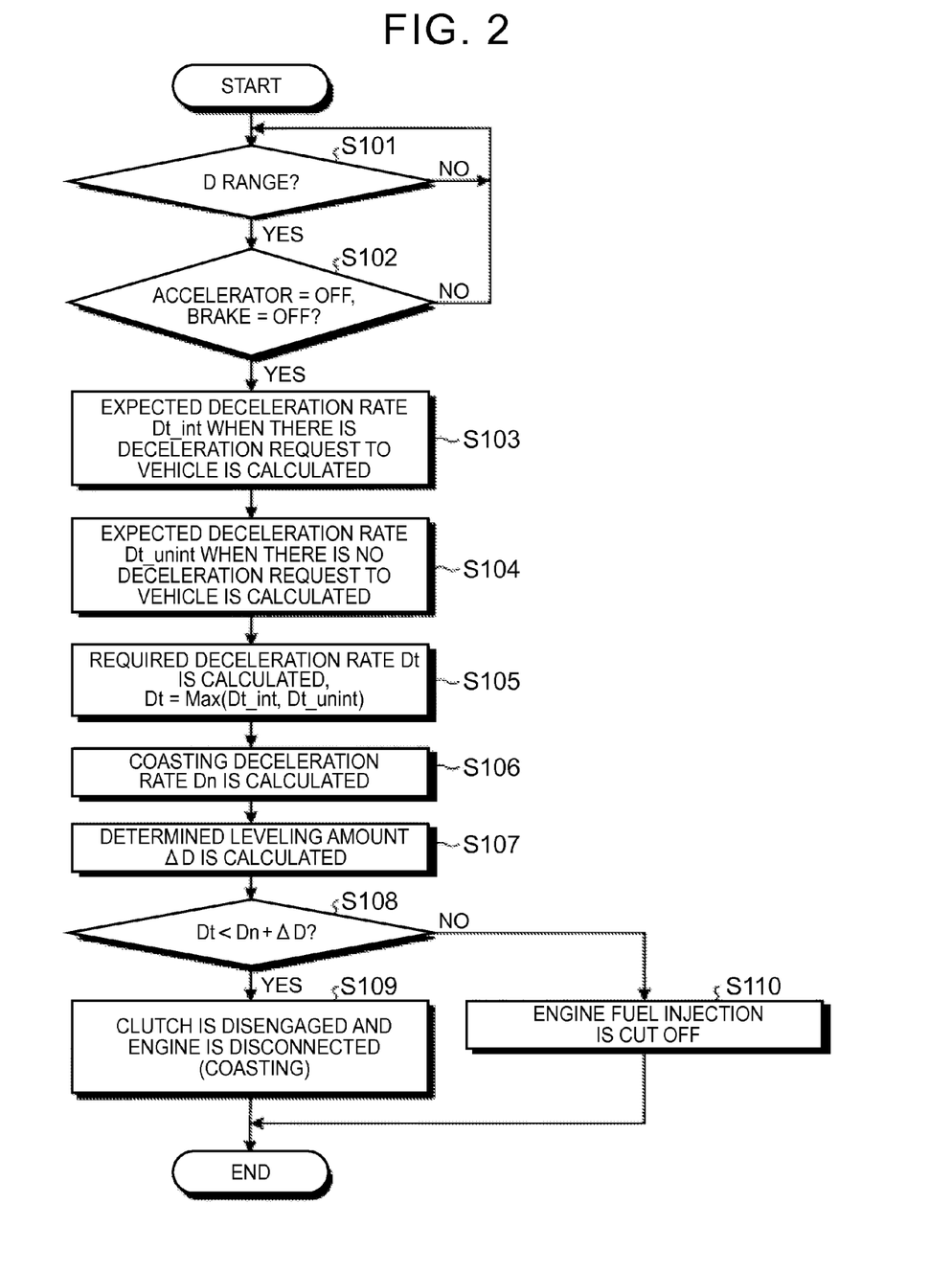
FIG. 2 is a flowchart illustrating the coasting control processing performed by the vehicle control device according to the present embodiment.
Figure 3:
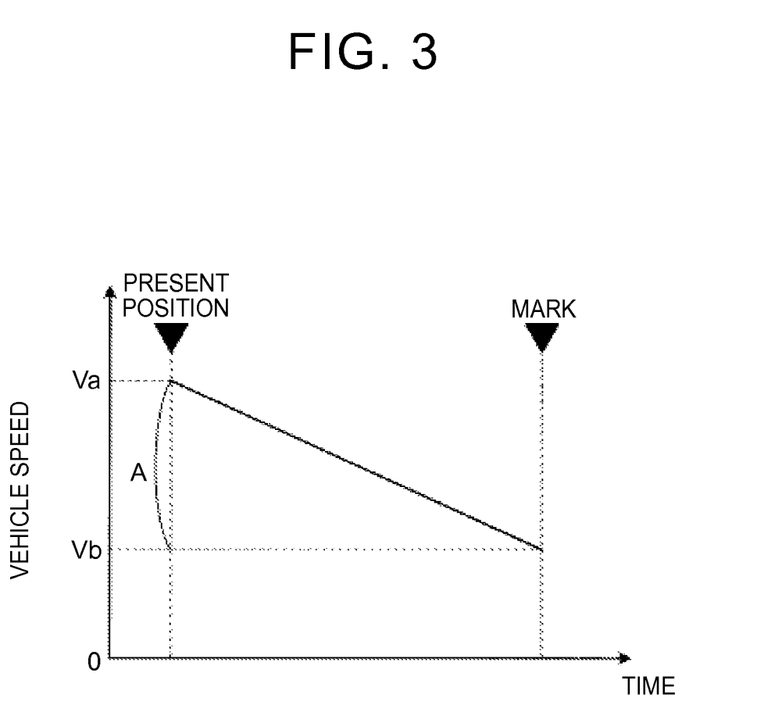
FIG. 3 illustrates a method for calculating the expected deceleration rate Dt_int in a case where there is a deceleration request to the vehicle.
Figure 4:
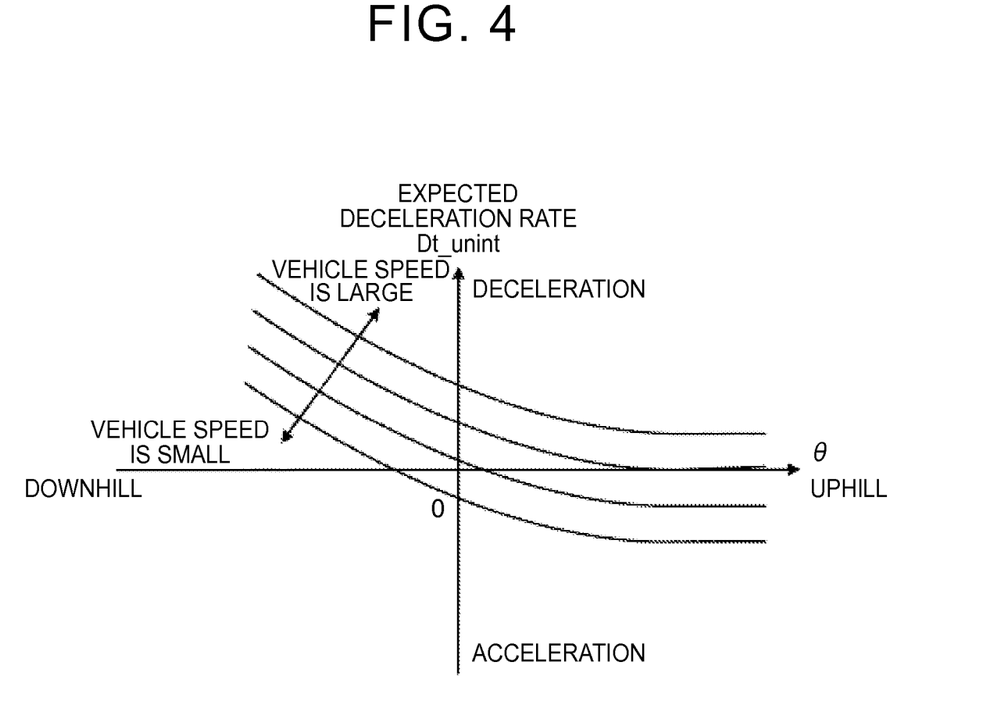
FIG. 4 illustrates an example of a map for calculating the expected deceleration rate Dt-unint in a case where there is no deceleration request to the vehicle.
Figure 5:
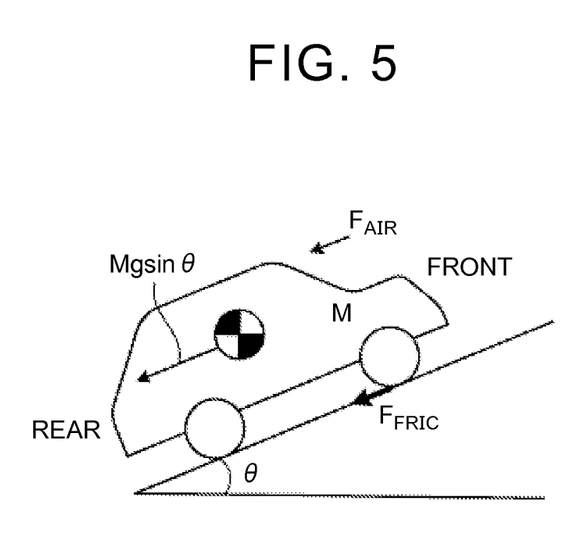
FIG. 5 illustrates elements for calculating the coasting deceleration rate Dn.

The operation of the vehicle control device 10 according to the present embodiment is explained below with reference to FIGS. 2 to 5. FIG. 2 is a flowchart illustrating the coasting control processing performed by the vehicle control device 10 according to the present embodiment. FIG. 3 illustrates a method for calculating the expected deceleration rate Dt_int when there is a deceleration request to the vehicle 1. FIG. 4 illustrates an example of a map for calculating the expected deceleration rate Dt_unint when there is no deceleration request to the vehicle 1. FIG. 5 illustrates each element for calculating the coasting deceleration rate Dn.

The vehicle control device 10 of the present embodiment executes the coasting control processing of the vehicle 1 according to the flowchart shown in FIG. 2. The processing is executed, for example, in each predetermined period.

First, the coasting determination unit 14 verifies whether or not the present shift position of the vehicle 1 is a D (drive) range on the basis of input information from the shift position sensor 22 (S101). When the shift position is the D range, the processing advances to step S102, and when the shift position is not the D range, the system waits till the shift position changes to the D range.

The coasting determination unit 14 then verifies whether or not both the accelerator and the brake are presently not actuated (accelerator=OFF, brake=OFF) on the basis of input information from the accelerator depression amount sensor 21 and the brake sensor 25 (S102). When the conditions of accelerator=OFF and brake=OFF are fulfilled, the processing advances to step S103. When the conditions of accelerator=OFF and brake=OFF are not fulfilled, the processing returns to step S101.

Thus, when the shift position is determined in step S101 to be the D range and the accelerator and brake are both determined in step S102 to be in an inactive state (accelerator=OFF, brake=OFF), the coasting determination unit 14 determines that there is no acceleration or deceleration request to the vehicle 1 while the vehicle travels, the clutch C1 is engaged, power is transmitted between the engine 2 and the drive wheels 4, and the coasting conditions are fulfilled, and executes the processing of step S103 and subsequent steps.

The expected deceleration rate Dt_int when there is a deceleration request to the vehicle 1 is then calculated by the required deceleration rate calculation unit 11 (S103). The "expected deceleration rate when there is a deceleration request to the vehicle 1", as referred to herein, means the deceleration rate which is supposedly required by the driver from the vehicle 1 in response to the presence of an object under the condition that the object, which the reason why the driver intends to decelerate the vehicle 1, is present in the travel direction in front of the vehicle 1. The expected deceleration rate Dt_int in this case varies according to the type of the object and the distance to the mark at which the object is reached.

More specifically, the required deceleration rate calculation unit 11 calculates the expected deceleration rate Dt_int when there is a deceleration request to the vehicle 1 by Eq. (1) below on the basis of the vehicle speed detected by the vehicle speed sensor 23 and the infrastructure information acquired by the infrastructure information acquisition unit 26.

$$Dt\_int=(Va \times Va - Vb \times Vb)/2/L \qquad (1)$$

where Va is the present vehicle speed, Vb is the target vehicle speed at the mark, and L is the distance from the present position to the mark. Va is detected by the vehicle speed sensor 23.

Vb and L can be variously set according to the type of the object. The object present in front of the vehicle can be identified and set according to the traveling scene by using the infrastructure information acquired by the infrastructure information acquisition unit 26. Examples, of the object include red light, stop sign, grade crossing, corner in front, and a vehicle decelerating in front. Examples of setting of Vb and L in such cases are presented below.

- red light: Vb=0, L=distance to the red light
- stop sign: Vb=0, L=distance to the stop sign
- grade crossing: Vb=0, L=distance to the grade crossing
- corner in front: Vb=corner entrance speed for safely negotiating the corner R in front, L=distance to the corner entrance
- vehicle decelerating in front: Vb=speed of the vehicle travelling in front, L=distance to the vehicle in front For any of the objects, the target vehicle speed Vb at the mark decreases below the present vehicle speed Va, as shown in FIG. 3. Therefore, the expected deceleration rate Dt_int calculated by Eq. (1) increases with the increase in difference between Va and Vb (segment A in FIG. 3) and with the distance L from the present position to the mark.

The required deceleration rate calculation unit 11 then calculates the expected deceleration rate Dt_unint when there is no deceleration request to the vehicle 1 (S104). In this case, "the expected deceleration rate when there is no deceleration request to the vehicle 1" means the deceleration rate estimated to be required by the driver of the vehicle 1 according to the running state or road state during cruising of the vehicle 1.

More specifically, the required deceleration rate calculation unit 11 calculates the expected deceleration rate Dt_unint when there is no deceleration request to the vehicle 1 by Eq. (2) on the basis of the vehicle speed detected by the vehicle speed sensor 23 and the road grade detected by the road grade sensor 24.

$$Dt\_unint = MAP(V, \theta) \qquad (2)$$

where V is the present speed of the vehicle 1, and θ is the present grade of the road where the vehicle 1 travels. The road is uphill or downhill when the grade θ has a positive or negative value, respectively. Va is detected by the vehicle speed sensor 23, and θ is detected by the road grade sensor 24.

More specifically, Eq. (2) determines the expected deceleration rate Dt_unint on the basis of the vehicle speed V and grade θ by using a map representing the relationship between the vehicle speed V, grade θ, and expected deceleration rate Dt_unint, such as shown by way of example in FIG. 4. In FIG. 4, the road grade θ is plotted against the abscissa, and the expected deceleration rate Dt_unint is plotted against the ordinate. The degree of deceleration increases with the transition in the positive direction along the ordinate, and the degree of acceleration increases with the transition in the negative direction along the ordinate.

In the map shown in FIG. 4, a plurality of graphs in which variations in the expected deceleration rate Dt_unint are plotted correspondingly to the road grade θ is shown for different vehicle speeds V. In the graphs, when the road grade θ has a positive value, that is, on the uphill road, the expected deceleration rate Dt_unint is set to be substantially constant regardless of the road grade, whereas when the road grade θ has a negative value, the expected deceleration rate Dt_unint is set to increase as the graph advances in the negative direction, that is, as the downhill grade increases. Further, the plurality of graphs corresponding to the vehicle speed V shifts upward as the vehicle speed V increases, that is, in the direction of increasing expected deceleration rate Dt_unint. In other words, in the map shown in FIG. 4, the expected deceleration rate Dt_unint is set to increase with the increase in the downhill grade and increase in the vehicle speed.

The required deceleration rate calculation unit 11 then calculates the required deceleration rate Dt (S105). The required deceleration rate calculation unit 11 calculates the required deceleration rate Dt by the following Eq. (3).

$$Dt = \text{Max}(Dt\_int, Dt\_unint) \qquad (3)$$

where Dt_int is an expected deceleration rate when there is a deceleration request to the vehicle 1, this expected deceleration rate being calculated in step S103, and Dt_unint is an expected deceleration rate when there is no deceleration request to the vehicle 1, this expected deceleration rate being calculated in step S104.

In Eq. (3), the larger of the calculated Dt_int and Dt_unint is calculated as the required deceleration rate Dt. Information on the calculated required deceleration rate Dt is transmitted to the coasting determination unit 14.

The coasting deceleration rate calculation unit 12 then calculates the coasting deceleration rate Dn representing the deceleration rate of the vehicle 1 when the engine is disconnected (clutch is disengaged) in the present running state (S106).

When the engine is disconnected in the vehicle 1 travelling on the road with a grade θ, external forces such as shown in FIG. 5 act upon the vehicle 1. In this case, the balance of forces in the traveling direction of the vehicle 1 is represented by the following Eq. (4).

$$M \cdot Dn = M \cdot g \cdot \sin\theta + F_{FRIC} + F_{AIR} \qquad (4)$$

where, M is the weight of the vehicle 1, g is gravity acceleration, θ is a road grade (uphill when θ>0), $F_{FRIC}$ is a sum total of friction resistances of the driveline after the clutch C1 (automatic transmission, propeller, differential, drive shaft, and tires), and $F_{AIR}$ is air resistance.

The air resistance $F_{AIR}$ can be represented in greater detail by Eq. (5).

$$F_{AIR} = \tfrac{1}{2} \cdot C_D \rho V^2 A \qquad (5)$$

where $C_D$ is an air resistance coefficient, ρ is an air density, V is a vehicle speed, and A is a projection area of the front surface of the vehicle 1.

The coasting deceleration rate Dn can be calculated by the following Eq. (6) on the basis of Eq. (4).

$$Dn = g \cdot \sin\theta + (F_{FRIC} + F_{AIR})/M \qquad (6)$$

Information on the calculated coasting Dn is transmitted to the coasting determination unit 14.

The determined leveling amount ΔD for determining whether or not to execute the coasting control is then calculated by the determined leveling amount calculation unit 13 (S107).

The determined leveling amount calculation unit 13 can perform calculations by changing the determined leveling amount ΔD according to the traveling scene. The determined leveling amount ΔD is a parameter for adjusting the determination criterion relating to whether to not to implement the coasting in the below-described coasting determination (see step S108). The possibility for implementing the coasting rises with the increase in the determined leveling amount ΔD, and the possibility for implementing the coasting decreases with the decrease in the determined leveling amount ΔD. The term "traveling scene" used in the present embodiment means surrounding factors relating to the frequency of acceleration and deceleration of the vehicle 1. More specifically, the traveling scene includes traffic congestion, a short distance to the vehicle in front, traveling in urban areas, small variations in vehicle speed or accelerator depression amount in a fixed past period of time, traveling in suburbs, traveling on highways or superhighways, and traveling on flat roads.

For example, when the traveling scene is traffic congestion, a short distance to the vehicle in front, traveling in urban areas, or the like, the coasting cannot be expected to improve fuel economy that much. Accordingly, the determined leveling amount calculation unit 13 sets a small determined leveling amount ΔD and the coasting is unlikely to occur. Conversely, where the traveling scene is small variations in vehicle speed or accelerator depression amount in a fixed past period of time, traveling in suburbs, traveling on highways or superhighways, and traveling on flat roads, the coasting can be expected to improve fuel economy. Therefore, a large determined leveling amount ΔD is set and the occurrence of coasting is facilitated. Information on the calculated determined leveling amount ΔD is transmitted to the coasting determination unit 14.

The coasting determination unit 14 then determines whether or not to implement the coasting (S108). More specifically, the coasting determination unit 14 performs the determination by using the condition represented by formula (7) below.

$$Dt < Dn + \Delta D \tag{7}$$

where Dt is the required deceleration rate Dt calculated in step S105, Dn is the coasting deceleration rate Dn calculated in step S106, and ΔD is the determined leveling amount ΔD calculated in step S107.

When the condition of formula (7) above is fulfilled, that is, when "the required deceleration rate Dt representing the estimated value of the deceleration rate sought by the driver when the vehicle 1 is traveling" is less than the sum total of the "coasting deceleration rate Dn representing the deceleration rate of the vehicle 1 when the engine cut-off (clutch disengagement) is executed in the present running state" and the "determined leveling amount ΔD", the coasting determination unit 14 determines that the deceleration rate sought by the driver (required deceleration rate Dt) is less than the deceleration rate occurring when coasting is implemented (coasting deceleration rate Dn) and that the coasting is unlikely to provide a sense of anxiety or discomfort to the driver, and thus determines that the coasting can be implemented.

Where it is determined in step S108 that the coasting can be implemented, the clutch C1 in the transmission 3 is disengaged by the clutch control unit 16, the engine 2 and the drive wheels 4 are disconnected, power transmission between the engine and 2 and the drive wheels 4 is cut off, and the vehicle 1 starts coasting (S109). Further, the fuel injection control unit 15 may be also configured such as to implement the control of cutting off the injection of fuel in the engine 2 at this time.

Meanwhile, where the condition represented by formula (7) above is not fulfilled in step S108, the deceleration rate sought by the driver (required deceleration rate Dt) is greater than the deceleration rate occurring when coasting is implemented (coasting deceleration rate Dn) and it is determined that the implementation of coasting can provide a sense of anxiety or discomfort to the driver and, therefore, it is determined that the coasting cannot be implemented. In this case, the engine disconnection (clutch disengagement) is not performed and power transmission between the engine 2 and the drive wheels 4 is maintained. Instead, the fuel injection control unit 15 performs the control to cut off fuel injection in the engine 2 (S110).

In the flowchart shown in FIG. 2, the implementation order of calculation processing of the required deceleration rate Dt in steps S103 to S105, coasting deceleration rate Dn in step S106, and determined leveling amount ΔD in step S107 can be changed as appropriate.

The effects produced by the vehicle control device 10 according to the present embodiment are explained below.

The vehicle control device 10 of the present embodiment is for the vehicle 1 capable of coasting, in which when there is no acceleration or deceleration request to the vehicle 1 while traveling, power transmission between the engine 2 and the drive wheels 4 is cut off and the vehicle 1 is allowed to travel by inertia. The vehicle control device 10 is configured such that in a state in which there is no acceleration or deceleration request to the vehicle 1 while traveling and power is transmitted between the engine 2 and the drive wheels 4, whether or not to implement the coasting is determined by comparing the required deceleration rate Dt which is estimated as a deceleration rate to be later required of the vehicle 1 and the coasting deceleration rate Dn which is estimated as a deceleration rate during the coasting. Where it is determined to implement the coasting, power transmission between the engine 2 and the drive wheels 4 is cut off and the coasting is implemented, and where it is determined not to implement the coasting, power transmission between the engine 2 and the drive wheels 4 is maintained.

With such a configuration, the implementation of coasting can be avoided by using the relationship between the required deceleration rate Dt and the coasting deceleration rate Dn. As a result, it is unlikely that the coasting be implemented, for example, when the driver wishes to perform deceleration at a rate greater than the present deceleration rate, and the frequency of providing a sense of anxiety or discomfort to the driver can be greatly reduced. As a result, the implementation of coasting that can provide a sense of anxiety or discomfort to the driver can be suppressed.

In the vehicle control device 10 of the present embodiment, "the required deceleration rate Dt" is the larger of the expected deceleration rate $Dt\_unint$ when there is no deceleration request to the vehicle 1 and the expected deceleration rate $Dt\ int$ when there is a deceleration request to the vehicle 1.

With such a configuration, the deceleration rate required by the driver can be determined with consideration for a wide range of traveling scenes, inclusive of the case in which there is a deceleration request from the driver to the vehicle 1 and the case in which there is no deceleration request and the driver unconsciously wants the vehicle to run steady. Therefore, the frequency of providing a sense of anxiety or discomfort to the driver can be further reduced.

In the vehicle control device 10 of the present embodiment, the expected deceleration rate $Dt\_unint$ when there is no deceleration request to the vehicle 1 is determined on the basis of the vehicle speed V and the road grade θ.

A sense of discomfort provided to the driver during coasting varies depending on the present speed V of the vehicle 1 and the grade θ of the road where the vehicle 1 travels. For example, a sense of discomfort apparently increases when the vehicle travels at a high speed or down a steep hill. Accordingly, with the configuration in which the expected deceleration rate Dt_unint is determined on the basis of the vehicle speed V and the road grade θ, the coasting can be implemented while reducing a sense of anxiety or discomfort in a wide range of traveling scenes.

The vehicle control device 10 of the present embodiment includes the infrastructure information acquisition unit 26 that acquires surrounding information relating to the vehicle 1, and the expected deceleration rate Dt_int when there is a deceleration request to the vehicle 1 is estimated from the surrounding information relating to the vehicle 1 that is acquired by the infrastructure information acquisition unit 26.

The discomfort provided to the driver during coasting varies depending on the distance L to the mark (signal or railroad crossing) which is the object for decelerating the vehicle 1, or the difference between the present vehicle speed Va and target vehicle speed Vb. For example, when the distance to the mark is small or when the difference in speed in large, the desirable deceleration amount increases. Therefore, the implementation of coasting will apparently increase the discomfort. Accordingly, as a result of estimating the expected deceleration rate Dt_int on the basis of the surrounding information relating to the vehicle 1 that has been acquired by the infrastructure information acquisition unit 26, with consideration for the abovementioned increase in discomfort, the coasting can be implemented while reducing a sense of anxiety or discomfort in a wide range of traveling scenes.

In the vehicle control device 10 of the present embodiment, a determination criterion for determining whether or not to implement the coasting is changed according to the traveling scene relating to the vehicle 1.

The frequency of causing a sense of discomfort in the driver changes according to the traveling scene. Thus, in a traveling scene with a high frequency of steady running periods, the driver is unlikely to be provided with a sense of discomfort during the coasting, but in a traveling scene with a large number of accelerations and decelerations, the driver is, conversely, often provided with a sense of discomfort. Accordingly, with the configuration in which the determination criterion as to whether or not to implement the coasting is changed according to the traveling scene, in a traveling scene in which a sense of discomfort is unlikely to be created by coasting, for example, when the frequency of steady running periods is high, it is possible to relax the determination criterion, facilitate the occurrence of coasting, and further improve fuel economy, whereas in a traveling scene in which a sense of discomfort is easily created by coasting, for example, when the frequency of accelerations and decelerations is high, a stringent determination criterion is selected, the coasting is unlikely to occur, and the frequency of causing a sense of discomfort can be reduced.

In the vehicle control device 10 of the present embodiment, the control of stopping fuel injection to the engine 2 is implemented, while maintaining power transmission between the engine 2 and the drive wheels 4, in response to the determination that the coasting is not to be performed. Therefore, fuel consumption can be reduced and fuel economy can be improved even when no coasting is implemented.

The preferred embodiments of the invention are explained hereinabove, but the invention is not limited to those embodiments. The functional blocks of the vehicle control device 10 shown in FIG. 1 are exemplified for convenience of explanation only, and other configurations may be used, provided that similar functions can be realized.

Further, in the embodiments, the configuration is explained in which fuel cut-off control that stops fuel injection to the engine 2 is implemented when it is determined not to implement the coasting, as shown in step S110 in the flowchart shown in FIG. 2, but the configuration in which the fuel cut-off control is not implemented when it is detected not to implement the coasting may be also used.

Further, in the embodiments, the coasting determination unit 14 determines whether or not to implement the coasting by using formula (7), as shown in step S108 in the flowchart shown in FIG. 2, but other conditional formulas can be also used. For example, a conditional formula (Dt<Dn) that compares the required deceleration rate Dt with the coasting deceleration rate Dn, without adding the determined leveling amount ΔD to the determination condition, a conditional formula (Dt<α×Dn) that compares the required deceleration rate Dt with the coasting deceleration rate Dn multiplied by a predetermined value α, or a conditional formula (Dt/Dn<β) that compares the ratio of the required deceleration rate Dt and the coasting deceleration rate Dn with a predetermined value β may be used instead of formula (7). Further, the conditional formulas (Dt<α×Dn+ΔD, Dt/Dn<β+ΔD) obtained by adding the determined leveling amount ΔD to those formulas may be also used similarly to formula (7).

1 vehicle
2 engine
4 drive wheels
10 vehicle control device
26 infrastructure information acquisition unit (information acquisition unit)
Dn coasting deceleration rate
Dt required deceleration rate
Dt_int expected deceleration rate when there is a deceleration request to the vehicle
Dt_unint expected deceleration rate when there is no deceleration request to the vehicle
ΔD determined leveling amount

The invention claimed is:

1. A vehicle control device for a vehicle capable of coasting, comprising:
   a controller which is configured to, in a state in which there is no acceleration or deceleration request to the vehicle while traveling and power is transmitted between the engine and the drive wheels, determine whether or not to implement the coasting by comparing a required deceleration rate that is estimated as a deceleration rate to be later required of the vehicle and a coasting deceleration rate that is estimated as a deceleration rate during the coasting,
   the controller is further configured to implement the coasting in a case where it is determined to implement the coasting, wherein during the coasting power transmission between an engine and drive wheels is cut off and the vehicle is allowed to travel by inertia, the controller is further configured to maintain power transmission between the engine and the drive wheels in a case where it is determined not to implement the coasting, and an information acquisition device that acquires surrounding information relating to the vehicle, wherein the required deceleration rate is the larger of an expected deceleration rate in a case where there is no deceleration request to the vehicle and an expected deceleration rate in a case where there is a deceleration request to the vehicle, wherein the expected deceleration rate in a case where there is no deceleration request to the vehicle is determined on the basis of a vehicle speed and a road grade, wherein the expected deceleration rate in the case where there is the deceleration request to the vehicle is estimated from the surrounding information relating to the vehicle that is acquired by the information acquisition device, and wherein the controller determines to implement the coasting when a condition that the required deceleration rate is smaller than a value determined based on the coasting deceleration rate is satisfied, and the controller determines to not implement the coasting when the condition is not satisfied.

2. The vehicle control device according to claim 1, wherein a determination criterion for determining whether or not to implement the coasting is changed according to a traveling scene relating to the vehicle.

3. The vehicle control device according to claim 1, wherein control of stopping fuel injection to the engine is implemented in response to a determination that the coasting is not to be performed.

* * * * *